United States Patent Office 3,563,910
Patented Feb. 16, 1971

3,563,910
CHEMICAL EMULSION COMPOSITIONS
Adolph E. Fishman, Baton Rouge, La., assignor to Ethyl Corporation, New York, N.Y., a corporation of Virginia
No Drawing. Filed Nov. 20, 1967, Ser. No. 684,498
Int. Cl. B01j *13/00*
U.S. Cl. 252—312                                9 Claims

ABSTRACT OF THE DISCLOSURE

Disclosure is made of emulsifier compositions based on polyalkoxy alcohol mixtures which are suitable for general emulsification of materials having a wide range of characteristics. In particular, emulsifier compositions are disclosed based on or derived from mixtures of normal and branched alcohols which provide highly stable aqueous emulsions with such diverse materials as aromatic hydrocarbons including benzene, xylene, and toluene; halo hydrocarbons including perchloroethylene; and open chain hydrocarbons including mineral oil, wax and kerosene.

BACKGROUND OF THE INVENTION

Field of the invention

The invention pertains to emulsifier compositions and to the art of making water emulsions of common materials usable for numerous diverse purposes such as in insecticides, fungicides, defoliants, degreasing agents, oil well drilling, adjuvants, as well as in the preparation of waxes or coatings such as paints for application to interior and exterior surfaces such as walls, furniture, floors, automobiles, natural and synthetic leather goods, and the like.

Description of the prior art

The prior art preparation of emulsions of water phase material and oil phase material is characterized by a high degree of specificity on the part of the emulsifier. For the most part, it is necessary with prior art materials to critically select emulsifier materials and match them to specific materials to be emulsified. Thus, previously it was necessary to have available numerous different prior art emulsification materials to handle emulsification problems with typical dissimilar materials such as benzene, kerosene, paraffinic mineral oil and paraffin wax. This is an undesired situation because it would be much easier for users of emulsifiers to have on hand a single type of emulsifier capable of handling a wide variety of different materials. Typical of the knowledge in this area is the publication of Paul Becher, "Emulsions Theory and Practice," Reinhold Publishing Corporation, New York, 2nd ed. (1965), p. 249. It appears that such prior art information is based on emulsifier materials of straight chain configuration in contrast to the particular straight-branched mixtures of the present invention.

SUMMARY OF THE INVENTION

The present invention relates to compositions of certain categories of polyalkoxy alcohols

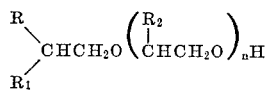

containing organic radicals

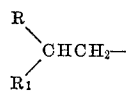

corresponding to those of mixtures of predominantly saturated normal and branched alcohols. The significance of R is normal alkyl and $R_1$ is normal alkyl or hydrogen, R and $R_1$ together having from about 16 to about 36 carbon atoms in individual molecules. The meaning of $n$ is average number of bracketed units, not necessary an integral number, ranging from about 1 to about 12, averaging from about 3 to about 10 in the mixture, more preferably averaging about 5. $R_2$ is hydrogen or lower alkyl from methyl to about propyl, hydrogen or methyl preferred, hydrogen particularly. Such compositions have excellent properties as emulsifiers for a wide range of materials pure and in admixture with certain inerts such as corresponding hydrocabons.

Although the invention per se is not limited to such specific narrow ranges, preferred ratios of normal alcohols.

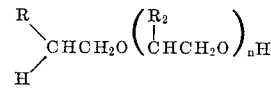

to branched alcohols,

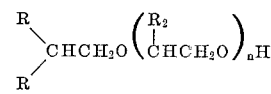

range from approximately 25 wt. percent branched and 75 wt. percent normal to approximately 75 percent branched and 25 percent normal. Typical specific mixtures include those wherein the normal and branched components are approximately equal, where the components are approximately 40 percent normal and 60 percent branched and where the components are approximately 60 percent normal and 40 percent branched. Preferred alkoxy unit, bracketed group, content corresponds to an average of about 5 ethylene oxide units per alcohol molecule containing an average of about 20 carbon atoms per molecule in addition to those in the alkoxy units. Although the foregoing specific exemplification is set forth, it is understood that a moderate range of materials will provide desirable end results, such as those of the foregoing type about having 3 alkoxy units (average) per alcohol molecule, ranging upwards to those corresponding to an average of about 10 alkoxy units per alcohol molecule. A narrower preferred range for the ratio of "average" number of alkoxy units per molecule of alcohol is from about 4 to about 8.

The processes whereby alkylene oxides add to primary alcohols involve a sequential statistical addition resulting in the production of mixtures as to numbers of alkoxy units per molecule of alcohol so that in most instances one always obtains a mixture of materials with typical mid-points of the ranges for particular mixtures being approximately 4, 5 or 8. Although in some instances it may be desirable to have relatively pure compositions in terms of the number of alkoxy units per alcohol molecule, mixtures as defined in the foregoing are generally preferred because of their apparent contribution to wide range emulsification properties.

DESCRIPTION OF THE PREFERRED EMBODIMENTS

Example 1

A mixture of high molecular weight normal and branched primary alcohols produced by aluminum chemistry through chain growth with ethylene and having a distribution of components on a parts by weight basis as tabulated below was reacted with 5 molecules of ethylene oxide per molecule of alcohol in a stirred autoclave at 140–160° C. and 30–50 p.s.i.g. in the presence of ¼ of 1 percent by wt. of NaOH based on the alcohol. The reaction took approximately 30 minutes. The product was a polyethoxy alcohol mixture corresponding to an average of 5 units of ethylene oxide per alcohol molecule. In typical mixtures of this and succeeding examples the balance up to 100 parts by weight (percent) was made up with normal and branched paraffins whose components were present in relative compositions approximating the distribution of the corresponding alcohols.

|  | Parts by weight | |
|---|---|---|
|  | ROH (St.) | ROH (Br.) |
| Carbon atoms per molecule: |  |  |
| $C_{18}$ | 0.88 |  |
| $C_{20}$ | 18.11 | 0.95 |
| $C_{22}$ | 12.11 | 1.78 |
| $C_{24}$ | 6.67 | 2.23 |
| $C_{26}$ | 3.61 | 4.55 |
| $C_{28}$ | 1.57 | 6.46 |
| $C_{30}$ | 0.74 | 5.39 |
| $C_{32}$ |  | 3.12 |
| $C_{34}$ |  | 2.00 |
| $C_{36}$ |  | 0.66 |
| $C_{38}$ |  | 0.27 |
| Total | 43.69 | 27.41 |

The emulsifier thus produced was mixed on a three percent (weight) basis with various oil-type materials including benzene, xylene, kerosene, perchloroethylene, paraffinic mineral oil, and paraffin wax. The resulting mixtures were completely miscible with water in all proportions at room temperatures. Excellent emulsions were produced with oil-water ratios ranging from 0.001 to 1 to 1000 to 1 on a weight basis. The materials were adjudged to be good emulsifiers on the basis of length of time the emulsions would stand without phase separation. Stability durations without phase separation were 16 hours and greater for all of the materials. Many of the emulsions remained stable for 30 days and longer.

Example 2

Example 1 was repeated using two percent emulsifier based on the amount of oil phase material used. Similar results were obtained, however, emulsion stability of the oil-water systems was somewhat less than with Example 1.

Example 3

Example 1 was repeated using five percent emulsifier materials of Example 1. Similar results were obtained. Since the emulsions of Example 1 were substantially "stable" to the extent that could be determined, the extra content of emulsifier did not produce notably greater stability but neither were the results poorer.

Example 4

Examples 1-3 were repeated with a different initial alcohol mixture of the same type as the foregoing and with the same mol ratio of olefin oxide addition. The initial alcohols had the following distribution of components on a parts by weight basis.

|  | ROH (St.) | ROH (Br.) |
|---|---|---|
| Carbon atoms per molecule: |  |  |
| $C_{20}$ | 16.66 | 1.68 |
| $C_{22}$ | 9.64 | 4.12 |
| $C_{24}$ | 5.07 | 5.11 |
| $C_{26}$ | 2.19 | 7.05 |
| $C_{28}$ |  | 6.97 |
| $C_{30}$ |  | 6.12 |
| $C_{32}$ |  | 2.05 |
| Total | 33.56 | 33.10 |

Similar results were obtained in emulsifier tests similar to those used in Examples 1-3.

Example 5

The foregoing examples were repeated using another initial alcohol mixture of the same type as the foregoing and with the same mol ratio of olefin oxide addition. The initial alcohols had the following distribution of components on a parts by weight basis.

|  | ROH (St.) | ROH (Br.) |
|---|---|---|
| Carbon atoms per molecule: |  |  |
| $C_{18}$ | 0.26 | 0.05 |
| $C_{20}$ | 14.79 | 0.96 |
| $C_{22}$ | 10.92 | 3.92 |
| $C_{24}$ | 6.81 | 4.53 |
| $C_{26}$ | 3.32 | 5.63 |
| $C_{30}$ |  | 5.99 |
| $C_{32}$ |  | 4.08 |
| $C_{34}$ |  | 1.31 |
| $C_{36}$ |  | 0.29 |
| Total | 36.10 | 26.76 |

Similar results were obtained in emulsifier tests similar to those used in Examples 1-3.

Example 6

The foregoing examples were repeated using another initial alcohol mixture of the following distribution of components on a parts by weight basis as material reacted with olefin oxide. Reaction was to the same average 5 mols olefin oxide per mol of alcohol.

|  | ROH (St.) | ROH (Br.) |
|---|---|---|
| Carbon atoms per molecule: |  |  |
| $C_{18}$ | 0.08 |  |
| $C_{20}$ | 13.18 | 0.67 |
| $C_{22}$ | 10.28 | 4.34 |
| $C_{24}$ | 6.24 | 5.52 |
| $C_{26}$ | 3.43 | 5.70 |
| $C_{28}$ | 2.07 | 6.35 |
| $C_{30}$ |  | 5.36 |
| $C_{32}$ |  | 4.30 |
| $C_{34}$ |  | 0.40 |
| Total | 35.28 | 32.64 |

Similar results were obtained in emulsifier tests similar to those used in Examples 1-3.

Example 7

The foregoing examples were repeated using another initial alcohol mixture of the following distribution of components on a parts by weight basis as material reacted with olefin oxide. Reaction was to the same average 5 mols olefin oxide per mol of alcohol.

|  | ROH (St.) | ROH (Br.) |
|---|---|---|
| Carbon atoms per molecule: |  |  |
| $C_{18}$ |  | 0.95 |
| $C_{20}$ | 22.36 | 3.31 |
| $C_{22}$ | 6.94 | 3.63 |
| $C_{24}$ | 3.54 | 4.67 |
| $C_{26}$ | 1.64 | 6.75 |
| $C_{28}$ |  | 7.44 |
| $C_{30}$ |  | 1.73 |
| Total | 34.48 | 28.48 |

Similar results were obtained in emulsifier tests similar to those used in Examples 1-3.

Example 8

The foregoing examples were repeated using olefin oxide to alcohol average mol ratios of 3 to 1, 4 to 1, 8 to 1, 10 to 1, 15 to 1 and 20 to 1 in place of the 5 to 1 average ratio of the preceding examples. Stability properties of resulting emulsions were generally inferior to the 5:1 ratio material. The materials with 5 mols (average) of ethylene oxide units per alcohol molecue had an HLB value of 8, those with 8 ethylene oxide mols (average) per mol of alcohol had an HLB value of approximately 10, those with 10 ethylene oxide mols (average) per mol. of alcohol had an HLB value of 12, those with 15 ethylene oxide mols (average) per mol of alcohol had an HLB value of 14 and those with 20 ethylene oxide mols (average) per mol of alcohol had an HLB value of 15. It is observed that the materials of the present invention with an HLB value of 8 had excellent properties as emulsifiers in comparison to other emulsifier materials that had HLB values of 15 even for aromatic materials such as benzene and xylene which by prior art standards seemingly require emulsifiers having HLB values of 15.

Example 9

The emulsifier of Example 1 was tested in simulated sea water (3.5 wt. percent salt) with kerosene. 80 grams of kerosene was mixed with 4 grams of the emulsifier of Example 1 and combined with 120 ml. of zero-hardness tap water (Baton Rouge) containing 4.2 grams of NaCl. The result was a 40-60 oil-water emulsion which was comparable in emulsion characteristics to the corresponding soft water emulsions of Examples 1 and 3.

Example 10

Example 9 was repeated in simulated oil field brine (12.5 wt. percent salt). The amount of salt used was 15 grams in place of the 4.2 grams of Example 9. Emulsion characteristics were similar to those of Examples 1, 3 and 9.

Example 11

Examples 9 and 10 are repeated with other combinations of the foregoing materials and with actual sea water and oil field brine. Similar results are obtained.

Example 12

The foregoing examples are repeated with various alcohol and alcohol-paraffin mixtures ranging from about 25 to about 75 wt. percent normal alcohols of those alcohols present and up to about 40 wt. percent corresponding paraffins which are reacted with pure and mixed olefin oxides including ethylene oxide, propylene oxide, butylene oxide and amylene oxide producing mixtures having from about 1 to about 12 alkoxy units per molecule, averaging from about 3 to about 10 alkoxy units per molecule. Typical specific averages of alkoxy units are 4, 5 and 8.

The materials are tested as emulsifiers in proportions from about 2 to about 10 percent by weight with individual materials and mixtures of lipophilic materials selected from the group consisting of benzene, xylene, toluene, kerosene, halo hydrocarbon, paraffinic mineral oil and paraffin wax. These combinations are tested in aqueous systems containing from about 99.9 percent water to about 0.1 wt. percent water and having from zero up to a saturation amount of sodium chloride. The mixtures are miscible in all proportions.

Preferred combinations contain about 5 percent of emulsifier based on the lipophilic material present. Preferred total water content of emulsion systems ranges on the one hand from about 95 to 99 wt. percent for dilute materials such as those containing insecticides and fungicides to be spread thinly. On the other hand, the water content of the combinations ranges down to substantially zero as with lubricants such as cutting oils which are intended to be removed effectively by water flushing.

I claim:

1. An emulsifier composition consisting essentially of a mixture of at least two poly alkoxy alcohols of the formula:

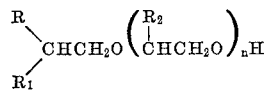

where:
R is normal alkyl having from 1 to about 36 carbon atoms
$R_1$ is selected from the group consisting of hydrogen and normal alkyl having from 1 to about 35 carbon atoms
R plus $R_1$ contains from about 16 to about 36 carbon atoms
$R_2$ is hydrogen or lower normal alkyl containing up to about 3 carbon atoms $n$ is from about 1 to about 12, averaging from about 3 to about 10 in the mixture, further characterized in that $R_1$ is hydrogen in from about 25 wt. percent to about 75 wt. percent of the alcohol molecules present.

2. An emulsifier composition in accordance with claim 1 further characterized in that
$n$ is an average of about 4 to 8 in the mixture, and
$R_1$ is hydrogen in from about 40 wt. percent to about 60 wt. percent of the alcohol molecules present.

3. An emulsifier composition in accordance with claim 1 further characterized in that
$n$ is an average of about 4 in mixture, and
$R_1$ is hydrogen in from about 40 wt. percent to about 60 wt. percent of the alcohol molecules present.

4. An emulsifier composition in accordance with claim 1 further characterized in that
$n$ is an average of 5 in the mixture, and
$R_1$ is hydrogen in from about 40 wt. percent to about 60 wt. percent of the alcohol molecules present.

5. An emulsifier composition in accordance with claim 1 further characterized in that
$n$ is an average of about 8 in the mixture, and
$R_1$ is hydrogen in from about 40 wt. percent to about 60 wt. percent of the alcohol molecules present.

6. The composition of claim 1 further characterized in that the alcohols are in admixture with up to about 40 wt. percent paraffin hydrocarbons corresponding substantially to the alcohols in distribution as to components with similar carbon skeleton structure.

7. The composition of claim 1 wherein the alcohols are up to about 75 wt. percent of the total mixture.

8. An emulsification system consisting essentially of from about 2 to about 10 percent by weight of emulsifier in accordance with claim 1 and from about 98 to about 90 percent of at least one lipophilic material selected from the group consisting of benzene, xylene, toluene, kerosene, halohydrocarbon, paraffinic mineral oil and paraffin wax.

9. A composition of matter consisting essentially of a mixture of at least two different poly alkoxy alcohols having the formula:

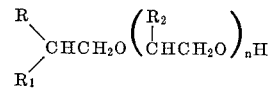

where:
R is normal alkyl having from 1 to about 36 carbon atoms
$R_1$ is selected from the group consisting of hydrogen and normal alkyl having from 1 to about 35 carbon atoms
R plus $R_1$ contains from about 16 to about 36 carbon atoms
$R_2$ is hydrogen or lower normal alkyl containing up to about 3 carbon atoms
$n$ is from about 1 to about 12, averaging from about 3 to about 10 in the mixture,
further characterized in that $R_1$ is hydrogen in from about 25 wt. percent to about 75 wt. percent of the alcohol molecules present.

References Cited

FOREIGN PATENTS 643,422   9/1950   Great Britain _____ 252—NID

LEON D. ROSDOL, Primary Examiner

W. E. SCHULZ, Assistant Examiner

U.S. Cl. X.R.

252—351; 260—615; 424—170